United States Patent
Hara et al.

(10) Patent No.: US 10,584,986 B2
(45) Date of Patent: Mar. 10, 2020

(54) DETECTING DEVICE, DETECTING METHOD, AND PROGRAM

(71) Applicant: INTERNATIONAL BUSINESS MACHINES CORPORATION, Armonk, NY (US)

(72) Inventors: Satoshi Hara, Tokyo (JP); Tetsuro Morimura, Tokyo (JP); Toshihiro Takahashi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 369 days.

(21) Appl. No.: 14/916,038

(22) PCT Filed: Aug. 29, 2014

(86) PCT No.: PCT/JP2014/072734
§ 371 (c)(1),
(2) Date: Jun. 21, 2016

(87) PCT Pub. No.: WO2015/033869
PCT Pub. Date: Mar. 12, 2015

(65) Prior Publication Data
US 2016/0327417 A1 Nov. 10, 2016

(30) Foreign Application Priority Data

Sep. 6, 2013 (JP) .................. 2013-184558

(51) Int. Cl.
*G01D 18/00* (2006.01)
*G05B 23/02* (2006.01)

(52) U.S. Cl.
CPC ......... *G01D 18/00* (2013.01); *G05B 23/0208* (2013.01); *G05B 23/0221* (2013.01); *G05B 23/0235* (2013.01); *B60W 2400/00* (2013.01)

(58) Field of Classification Search
CPC ............ G05B 23/0221; G05B 23/0235; G05B 23/0208; G06Q 10/04; G01D 18/00; B60W 2400/00
See application file for complete search history.

(56) References Cited

U.S. PATENT DOCUMENTS 5,109,475 A    4/1992  Kosaka
6,230,064 B1   5/2001  Nakase
(Continued)

FOREIGN PATENT DOCUMENTS

CN    102192758 A    9/2011
CN    102223046 A    10/2011
(Continued)

OTHER PUBLICATIONS

Banerjee, O. et al. "Model selection through sparse maximum likelihood estimation for multivariate Gaussian or binary data," Journal of Machine Learning Research, vol. 9, pp. 485-516, 2008.
(Continued)

*Primary Examiner* — Yoshihisa Ishizuka
(74) *Attorney, Agent, or Firm* — Cantor Colburn LLP; Joseph Petrokaitis (57) ABSTRACT

Embodiments of the present invention specify a group of sensors detecting normal operation and a group of sensors detecting abnormal operation from time-series data on the sensors without using threshold values that are based on the experience of users. One aspect of an embodiment is a detecting device for detecting changes in the output of a plurality of sensors, in which the detecting device includes: a first output acquiring unit for acquiring a first relevance matrix; a second output acquiring unit for acquiring a second relevance matrix; a change calculating unit for calculating a change matrix representing the degree of change between the first relevance matrix and the second relevance matrix; and a specifying unit for specifying a group of sensors
(Continued)

showing a degree of change greater than the others in the change matrix. Other aspects of the present invention include a detecting method and a program.

12 Claims, 4 Drawing Sheets

(56) References Cited

U.S. PATENT DOCUMENTS

| | | | |
|---|---|---|---|
| 7,787,969 B2 * | 8/2010 | Grichnik | G05B 19/0423 700/110 |
| 2002/0062162 A1 * | 5/2002 | Bunkofske | G05B 23/0221 700/108 |
| 2005/0197806 A1 * | 9/2005 | Eryurek | G05B 23/0221 702/188 |
| 2005/0209820 A1 | 9/2005 | Inoue | |
| 2007/0129912 A1 | 6/2007 | Inoue | |
| 2008/0183423 A1 * | 7/2008 | Ide | G06K 9/6253 702/180 |

FOREIGN PATENT DOCUMENTS

| | | |
|---|---|---|
| GB | 2224868 A | 5/1990 |
| JP | H02168350 A | 6/1990 |
| JP | H1125169 A | 1/1999 |
| JP | H11328255 A | 11/1999 |
| JP | 2002015000 A | 1/2002 |
| JP | 2003044123 A | 2/2003 |
| JP | 3699807 B2 | 9/2005 |
| JP | 2005257416 A | 9/2005 |
| JP | 3718765 B2 | 11/2005 |
| JP | 2010078467 A | 4/2010 |
| JP | 5186322 B2 | 4/2013 |

OTHER PUBLICATIONS

International Search Report for International Application No. PCT/JP2014/072734; International Filing Date Aug. 29, 2014; dated Nov. 18, 2014; 3 Pages.

Written Opinion for International Application No. PCT/JP2014/072734; International Filing Date Aug. 29, 2014; dated Nov. 18, 2014; 3 Pages.

Yuan M. et al. "Model selection and estimation in the Gaussian graphical model" Biometrika, vol. 94, No. 1, 2007, pp. 19-35.

* cited by examiner

DETECTING DEVICE, DETECTING METHOD, AND PROGRAM

FOREIGN PRIORITY

This is a U.S. national stage of application No. PCT/JP2014/072734, filed on Aug. 29, 2014. Priority under 35 U.S.C. § 119(a) and 35 U.S.C. § 365(b) is claimed from Japan Patent Application No. 2013-184558, filed Sep. 6, 2013, and all the benefits accruing therefrom under 35 U.S.C. § 119, the contents of which in its entirety are herein incorporated by reference.

TECHNICAL FIELD

The present invention relates to a detecting device, a detecting method, and a program.

BACKGROUND ART

Sensors are installed in complex systems such as vehicles and manufacturing equipment, and time-series data acquired from these sensors is analyzed. Processing can be performed to analyze the time-series data and monitor a system for abnormalities even when hundreds of sensors have been installed in a system (see, for example, Patent Literature 1). Patent Literature 1: Laid-open Patent Publication No. 2010-78467.

SUMMARY OF INVENTION

Technical Problems

In this type of processing, a group of sensors indicating detection results in which the inputted signals are within a normal signal range (normal sensors) and a group of sensors indicating detection results in which the inputted signals are within an abnormal signal range (abnormal sensors) are identified in the time-series data by assigning scores to the sensors for their degree of abnormality on the basis of the degree of change in the relational structure between sensors. An appropriate threshold value has to be established in this situation because the score for the degree of abnormality is compared to a predetermined threshold value in order to identify the normal sensors and the abnormal sensors. However, the threshold value is a parameter which has a direct impact on identification results, and has to be established by users on the basis of experience.

Solution to Problems

A first aspect of the present invention is a detecting device for detecting changes in the output of a plurality of sensors, in which the detecting device includes: a first output acquiring unit for acquiring a first relevance matrix representing the degree of relevance between a plurality of sensors during a first output from the plurality of sensors; a second output acquiring unit for acquiring a second relevance matrix representing the degree of relevance between a plurality of sensors during a second output from the plurality of sensors; a change calculating unit for calculating a change matrix representing the degree of change between the first relevance matrix and the second relevance matrix; and a specifying unit for specifying, as a group of changing sensors showing a change between the first output and the second output, a group of sensors showing a degree of change greater than the others in the change matrix. Other aspects of the present invention are a detecting method and a program.

This summary of the present invention is not intended to enumerate all of the required characteristics of the present invention. The present invention may be realized by any combination or sub-combination of these characteristics.

DESCRIPTION OF EMBODIMENT

The following is an explanation of the present invention with reference to an embodiment of the present invention. However, the present embodiment does not limit the present invention in the scope of the claims. Also, all combinations of characteristics explained in the embodiment are not necessarily required in the technical solution of the present invention.

Figure 1:
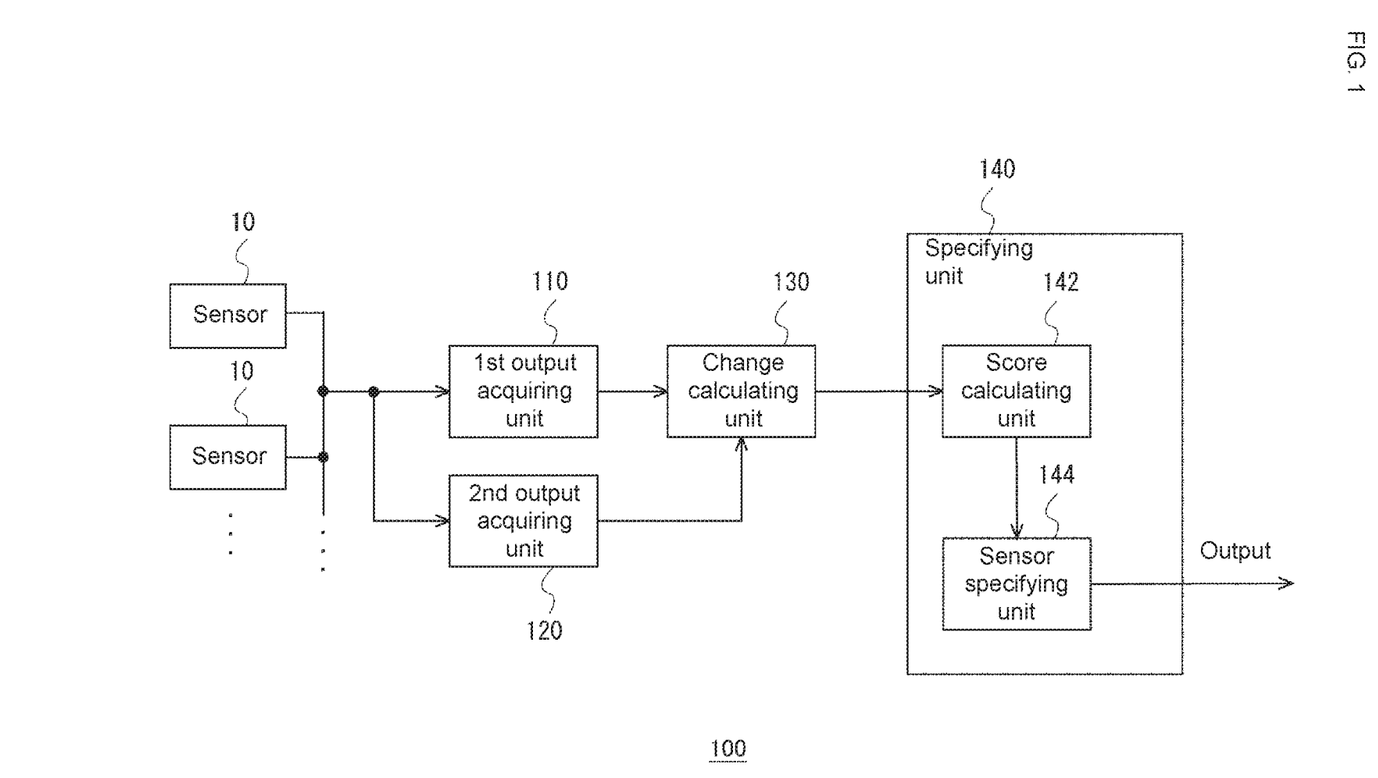
FIG. 1 shows an example of a configuration for the detecting device 100 in an embodiment of the present invention along with a plurality of sensors 10.

FIG. 1 shows an example of a configuration for the detecting device 100 in an embodiment of the present invention along with a plurality of sensors 10. Here, the sensors 10 are installed in an object such a vehicle or other transportation machinery, manufacturing equipment, or monitoring equipment, and the detection results are sent to a detecting device 100. The sensors 10 may be connected to the detecting device 100 via wires, or may be connected wirelessly. In the explanation of the present embodiment, the object is a vehicle.

In this example, the sensors 10 are temperature sensors for engine cooling water, temperature sensors for engine air intake, oil temperature sensors, intake pipe pressure sensors for a fuel injection system, supercharging pressure sensors for a turbocharger, throttle position sensors, steering angle sensors, vehicle height sensors, liquid level sensors, rotational speed sensors, knock sensors, acceleration sensors, angular velocity sensors, geomagnetic sensors, flow sensors, oxygen sensors, and air-fuel ratio sensors. In some situations, anywhere from several hundred to more than a thousand sensors 10 may be installed.

In these situations, time-series data from hundreds and even thousands of sensors has to be processed. However, the time-series data from sensors installed, for example, in a vehicle cannot be predicted in advance as dynamic changes occur among the data values themselves and in the relational structure between sensors, and these dynamic changes are sporadic. For example, when a vehicle "accelerates" when a driver "steps on the accelerator", the relational structure between sensors, such as between the output from throttle position sensors, rotational speed sensors and acceleration sensors, is strong. In other words, the dynamic change in the relational structure between the sensors follows a timing that can be predicted in advance (for example, from the operations of the driver and vehicle conditions).

In this situation, there are also changes in the detected output of each sensor and the range of values deemed normal for the detected output due to vehicle conditions such as the weight of the passengers (or baggage), the current speed of the vehicle, the gradient of the road, and whether the road is straight or curved (including the degree of curvature when curved). In other words, the output of each sensor and the criteria for determining whether or not the output is normal change dynamically following timing that cannot be predicted in advance (for example, from the operations of the driver and vehicle conditions).

Because the data values and reference criteria in the time-series signals from a single sensor change significantly in response to changes in the relational structure to other sensors, it is difficult to perform meaningful processing even when a comparison is made with past data. Analysis treating each sensor as a multivariate sensor has been considered, but the number of calculations performed increases exponentially with the increase in the number of sensors, and becomes impractical when several hundred or more than a thousand sensors are used.

Estimating the degree of change in the relational structure between sensors and scoring the degree of abnormality in a sensor on the basis of the results has also been considered. In this situation, the normal sensors and abnormal sensors can be identified by comparing the degree of abnormality in each score to a predetermined threshold value. However, it is difficult to establish the appropriate threshold values. Also, when the degree of abnormality is scored for each sensor, it is difficult to score this degree of abnormality so that abnormalities can be detected reliably.

The detecting device 100 in the present embodiment detects changes in the output of sensors 10, and identifies a group of sensors selected from the plurality of sensors that detect normal operation (the normal sensors) and a group of sensors selected from the plurality of sensors that detect abnormal operation (the abnormal sensors) without using threshold values that are based on user experience. The detecting device 100 estimates the relational structure between sensors in a matrix in accordance with referential and comparative time-series data from the sensors, represents the results in matrices, compares the matrices, and identifies the sensors with smaller changes in their relational structures as the normal sensors.

The detecting device 100 includes a first output acquiring unit 110, a second output acquiring unit 120, a change calculating unit 130, and a specifying unit 140.

The first output acquiring unit 110 is connected to a plurality of sensors 10, and calculates and acquires a first relevance matrix indicating the relevance between the plurality of sensors 10 during the first output from the sensors 10. The first output acquiring unit 110 may also acquire the data in the first relevance matrix which is stored in the detecting device 100 or in an external memory device. The first output acquiring unit 110 may also acquire the data in the data in the first relevance matrix which is calculated from the first output by an external device connected to the plurality of sensors 10. The first output in the present embodiment is output signals from the output of the sensors 10 which are used as reference signals.

When the vehicle is in a normal state, the first output acquiring unit 110 receives, as the first output from the plurality of sensors 10, the output from the sensors 10 detecting normal operation. Alternatively, the first output acquiring unit 110 may acquire, as the first output, output from the plurality of sensors 10 in a predetermined time period.

The first output acquiring unit 110 may acquire, as the first relevance matrix, a matrix including elements corresponding to all combinations of two sensors 10 among the plurality of sensors 10, where each element represents the relevance between two sensors 10. For example, when the number of sensors 10 is d, the first output acquiring unit 110 acquires a first relevance matrix that is a symmetric matrix with d rows and d columns. In the explanation of the present embodiment, when the vehicle provided with the sensors 10 is operating in a normal state, the first output acquiring unit 110 acquires a first relevance matrix corresponding to the first output outputted by the sensors 10.

The second output acquiring unit 120 is connected to a plurality of sensors 10, and calculates and acquires a second relevance matrix indicating the relevance between the plurality of sensors 10 during the second output from the sensors 10. The second output acquiring unit 120 may also acquire the data in the second relevance matrix which is stored in the detecting device 100 or in an external memory device. The second output acquiring unit 120 may also acquire the data in the data in the second relevance matrix which is calculated from the second output by an external device connected to the plurality of sensors 10. The second output in the present embodiment is output signals from the output of the sensors 10 which are used as reference signals.

Preferably, the second output acquiring unit 120 acquires, as the second output from the sensors 10, output signals used to specify whether or not the vehicle is operating normally while traveling (in other words, output signals during a test period). Alternatively, the second output acquiring unit 120 may acquire, as the second output, output from the sensors 10 during a predetermined time period which is different from the time period during which the first output was acquired by the first output acquiring unit 110.

The second output acquiring unit 120 may acquire, as the second relevance matrix, a matrix including elements corresponding to all combinations of two sensors 10 among the plurality of sensors 10, where each element represents the relevance between two sensors 10. For example, when the number of sensors 10 is d, the second output acquiring unit 120 acquires a second relevance matrix that is a symmetric matrix with d rows and d columns.

In the explanation of the present embodiment, the second output acquiring unit 120 acquires a second relevance matrix corresponding to the second output outputted by the sensors 10 during the test period for the vehicle. In other words, in the present embodiment, the first signals acquired during normal operation serve as reference signals, the second signals acquired during the test period are comparative signals, and the detection of changes in the sensor output in the basis of the changes in the relevance between sensors corresponds to the detection of abnormal sensors.

The change calculating unit 130 is connected to the first output acquiring unit 110 and the second output acquiring unit 120, and calculates a change matrix representing the degree of change between the first relevance matrix and the second relevance matrix. The change calculating unit 130 may calculate a change matrix on the basis of the absolute values of the differences between the first relevance matrix and the second relevance matrix. In one example, the change calculating unit 130 calculates, as the change matrix, the absolute values of the differences between the first relevance matrix and the second relevance matrix.

The specifying unit 140 is connected to the change calculating unit 130 and specifies a group of unchanging sensors and/or changing sensors on the basis of the change matrix. For example, the specifying unit 140 may specify, as a group of changing sensors with reference to change between the first output and the second output, a group of sensors with a larger degree of change than the others.

The specifying unit 140 may also specify, as a group of unchanging sensors with reference to change between the first output and the second output, a group of sensors with a smaller degree of change than the others. Then, the specifying unit 140 specifies a group of changing sensors on the basis of a specified group of unchanging sensors. The specifying unit 140 may specify, from the change matrix, a submatrix with a smaller degree of change than the rest, and specify the group of sensors not corresponding to the submatrix as the group of changing sensors.

The specifying unit 140 may also specify, as a group of changing sensors with reference to change between the first output and the second output, a group of sensors with a smaller degree of change than the others. The specifying unit, for example, specifies a submatrix with a smaller degree of change than the rest, and specifies the group of sensors corresponding to the submatrix as the group of unchanging sensors.

Here, the group of unchanging sensors among the sensors 10 include the sensors 10 with no change in their relational structure corresponding to the reference signals and the comparative signals, and match the normal sensors. The group of changing sensors includes the sensors 10 with a change in their relational structure corresponding to the reference signals and the comparative signals, and match the abnormal sensors. More specifically, the specifying unit 140 specifies a group of changing sensors and/or a group of unchanging sensors by scoring the group of changing sensors. The specifying unit 140 has a score calculating unit 142 and a sensor specifying unit 144.

The score calculating unit 142 calculates scores for the sensors 10 to minimize the objective function corresponding to a value obtained by multiplying scores for the sensors 10 corresponding to their degree of change by each of the degrees of change included as elements in the change matrix. The score calculating unit 142 calculates scores for the sensors 10 to minimize the objective function on condition that the score of each sensor 10 is equal to or greater than 0. The score calculating unit 142 also calculates scores for the sensors 10 to minimize the objective function on further condition that the sum of the scores of the sensors 10 is a predetermined value.

The sensor specifying unit 144 for specifies a group of unchanging sensors not showing a change between the first output and the second output, and a group of changing sensors on the basis of the scores of the sensors 10. For example, the sensor specifying unit 144 includes sensors with a score that is not zero in the group of unchanging sensors, and specifies these as normal sensors. Instead or this, or in addition to this, the sensor specifying unit 144 may include sensors with a score of zero in the group of changing sensors, and specifies these as abnormal sensors.

The detecting device 100 may also include a storage unit for storing the first output, the second output, the first relevance matrix, the second relevance matrix, the change matrix, the objection function, the scores, the group of changing sensors and/or the group of unchanging sensors, and other data.

The detecting device 100 in the present embodiment determines each relational structure corresponding to reference signals and comparative signals from the sensors 10, and determines the normal sensors and abnormal sensors in accordance with changes in the relational structures. Here, the detecting device 100 can calculate the scores in accordance with the degree of change in the relational structures, and determine whether or not a sensor 10 is an abnormal sensor on the basis of whether or not the score is zero. As a result, threshold values that are based on the experience of users are not required.

Figure 2:
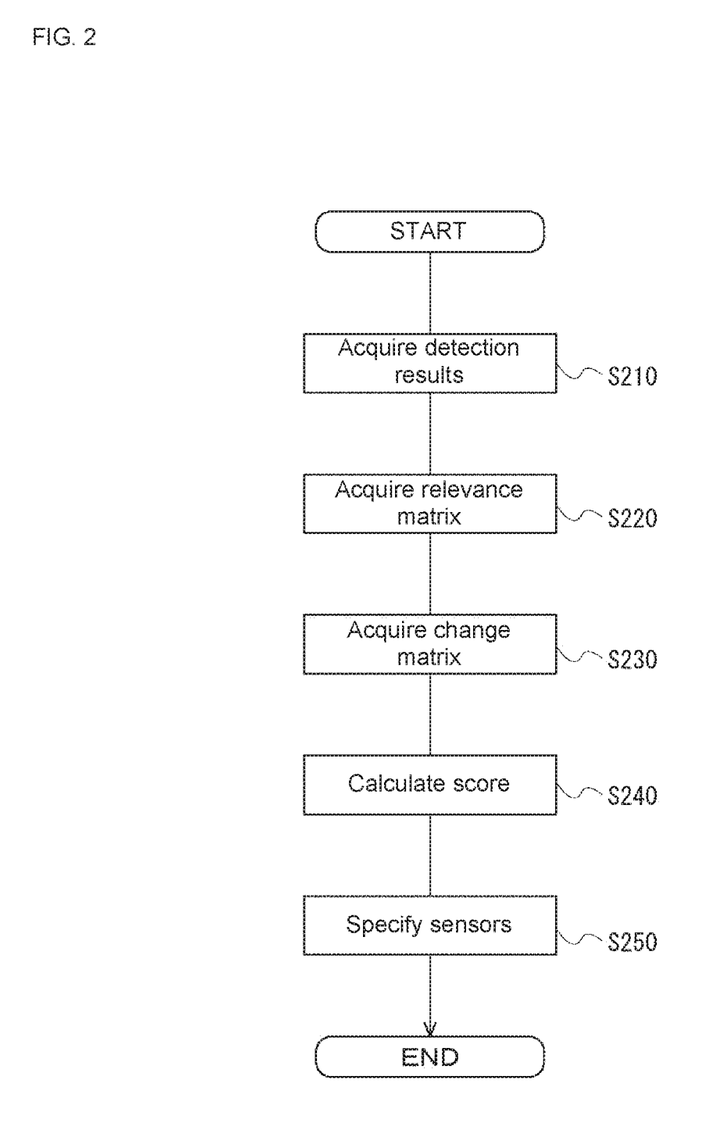
FIG. 2 shows the flow of operations performed by the detecting device 100 in the embodiment of the present invention.

FIG. 2 shows the flow of operations performed by the detecting device 100 in the embodiment of the present invention. The detecting device 100 executes this flow of operations to specify which of the sensors 100 are normal sensors and which are abnormal sensors.

First, the first output acquiring unit 110 and the second output acquiring unit 120 acquire detection results from the sensors 10 (S210). For example, the first output acquiring unit 110 acquires reference signals r, and the second output acquiring unit 120 acquires the comparative signals x. The first output acquiring unit 110 may store the acquired data in the storage unit. In the following explanation, ten sets of signal data r and signal data x are acquired from a total of d sensors 10 during a predetermined time period to obtain a total of t x d data.

Next, the first output acquiring unit 110 and the second output acquiring unit 120 calculate and acquire relevance matrices $\Lambda_n$ (n=1, 2) on the basis of reference signals r and comparative signals x (S220). The first output acquiring unit 110 and the second output acquiring unit 120 may store the calculated relevance matrices $\Lambda_n$ in the storage unit. Here, the relevance matrices $\Lambda_n$ are matrices with d rows and d columns.

Relevance matrix $\Lambda_n$ indicates the first relevance matrix when n=1, and the second relevance matrix when n=2. The first output acquiring unit 110 and the second output acquiring unit 120 may define and calculate these in accordance with the following equation (see, for example, M. Yuan and Y. Lin, "Model selection and estimation in the Gaussian graphical model," Biometrika, vol. 94, pp. 19-35, 2007, and O. Banerjee, L. El Ghaoui, and A. d'Aspremont, "Model selection through sparse maximum likelihood estimation for multivariate Gaussian or binary data," Journal of Machine Learning Research, vol. 9, pp. 485-516, 2008).

$$\Lambda_n = \underset{\Lambda}{\operatorname{argmin}}\left[-\log\det\Lambda + tr[S_n\Lambda] + \rho\sum_{i,j}|\Lambda_{i,j}|\right] \quad \text{[Equation 1]}$$

Here, argmin f(x) is x when f(x) has been minimized, and $\Lambda$ is $\Lambda_n$ when the right-hand expression in Equation 1 has been minimized (the relevance is estimated). Also, detA is the determinant for matrix A, and trA is the sum of the diagonal component of matrix A. Also, $|\Lambda_{i,j}|$, is the absolute value of element (i, j) in matrix $\Lambda$.

Here, the third term including $|\Lambda i, j|$ in the right-hand expression of Equation 1 is the regularization term which has been added to $\Lambda$n in order to obtain a sparse matrix in which most of the components are zero. Also, $\rho$ establishing the size of the regularization term is a parameter used to control the number of zero elements included in the estimated $\Lambda$n. This regularization parameter is determined beforehand by the user.

Here, the regularization parameter $\rho$ is set, for example, to a value equal to or less than 0.01. If the normalization parameter $\rho$ is actually a value equal to or less than 0.01, it has little or no effect on the calculated scores in the present embodiment, and the value does not have to be adjusted. Also, $S_n$ is the sample covariance matrix of the nth signal data, and is defined by the following equation.

$$S_1 = \frac{1}{T}\sum (r_{i,t} - \bar{r}_i)(r_{j,t} - \bar{r}_j), \quad \text{[Equation 2]}$$

$$S_2 = \frac{1}{T}\sum (x_{i,t} - \bar{x}_i)(x_{j,t} - \bar{x}_j)$$

Equation 1 for estimating the relational structure between sensors 10 is known as a regularized maximum likelihood estimation method. The first output acquiring unit 110 and the second output acquiring unit 120 obtain the first relevance matrix $\Lambda_1$ and the second relevance matrix $\Lambda_2$ in accordance with the reference signals r and comparative signals x.

Alternatively, the first output acquiring unit 110 and the second output acquiring unit 120 may calculate and/or acquire relevance matrices different from Equation 1. For example, the relevance matrices can be calculated on the basis of an Ising Model. The first output acquiring unit 110 and the second output acquiring unit 120 may also select relevance matrices in accordance with the type of data being handled (for example, binary data such as 1 and 0).

Next, the change calculating unit 130 acquires the relevance matrices $\Lambda_n$ and calculates a change matrix (S230). The change calculating unit 130 may retrieve relevance matrices $\Lambda_n$ stored in the storage unit, or store calculated change matrices in the storage unit. The following is an explanation of an example in which the change calculating unit 130 first calculates the absolute values of the differences between the first relevance matrix $\Lambda_1$ and the second relevance matrix $\Lambda_2$ as the change matrix D.

$$D = \text{abs}(\Lambda_1 - \Lambda_2) \quad \text{[Equation 3]}$$

Next, the score calculating unit 142 receives the change matrix and calculates scores for a plurality of sensors 10 (S240). The score calculating unit 142 may retrieve change matrices stored in the storage unit, and store calculated scores in the storage unit. The score calculating unit 142 may select a calculation equation for calculating the scores on the basis of given conditions. For example, when the number of normal sensors or a lower limit k for the number of normal sensors is predetermined, the score calculating unit 142 uses the following calculation equation for score S*.

$$\vec{s}^* = \underset{\vec{s} \in \{0,1\}^d}{\arg\min} \frac{1}{2} \vec{s}^T D \vec{s}, \text{ subject to } \vec{1}_d^T \vec{s} = k \quad \text{[Equation 4]}$$

As shown in Equation 4, the score calculating unit 142 calculates score S* for a plurality of sensors 10 to minimize the objective function on condition that the sum of the scores of the sensors 10 is equal to a predetermined number of unchanging sensors. Here, "subject to" represents the limiting condition. Score S and score S* are also column vectors with d elements, and element $S_{*i}$ represents the score for each of the d sensors 10. Also, "$_T$" represents the transposed vector (in other words, $S_T$ is a row vector).

The score calculating unit 142 calculates the scores of the sensors 10 to minimize the objective function of Equation 4 on further condition that the value of the score of each sensor 10 is 0 or 1. In other words, the score calculating unit 142 calculates a score S* satisfying Equation 4 is on condition that the elements of the minimized score S take a value discretized as either 0 or 1. Here, Equation 4 is an objective function which has been discrete-optimized and normalized, and is known as a discrete optimization problem (0-1 integer programming). A specific method for minimizing an objective function to calculate score S* is known.

Next, the sensor specifying unit 144 receives the scores, and specifies which sensors 10 are abnormal sensors and which sensors 10 are normal sensors (S250). The sensor specifying unit 144 may retrieve scores stored in the storage unit, and may store specified sensor information in the storage unit. The sensor specifying unit 144 includes sensors 10 corresponding to score S*i with a score S*i value of 0 in the group of changing sensors.

When the score calculating unit 142 places an element with a value of 1 in the column vector of score S for an element in the change matrix D in response to the element having a large value, it acts in a direction increasing the objective function in Equation 4, and the result of multiplying the element with the large value by one is not zero. When the score calculating unit 142 places element 0 in the column vector of score S for an element in the change matrix D in response to the element having a large value, it acts in a direction decreasing the objective function, and the result of multiplying the element with the large value by 0 is zero.

Similarly, when the score calculating unit 142 places an element with a value of 1 in the column vector of score S for an element in the change matrix D in response to the element having a small value (or 0), it acts in a direction decreasing the objective function, and the result of multiplying the element with the small value by one is not zero. Therefore, the score calculating unit 142 places k number of elements with a value of 1 in the column vector of score S in response to an element in change vector D having a small value (or 0), and minimizes the objective function.

In other words, the score calculating unit 142 searches out the relational structures with a small (or large) change among the relational structures for sensors 10 between reference signals and comparative signals, and the sensor specifying unit 144 specifies the corresponding abnormal sensors and/or normal sensors in response to the discovered relational structures. In this way, the detecting device 100 in the present embodiment can specify which sensors 10 are normal and which are abnormal based on whether the value of score S*i is zero or not zero instead of using a threshold value that is based on the experience of the user.

The score calculating unit 142 in the present invention was explained using the objective function in Equation 4. However, the score calculating unit 142 may use the objective function in the following equation.

$$\vec{s}^* = \underset{\vec{s} \in [0,1]^d}{\arg\min} \frac{1}{2} \vec{s}^T D \vec{s}, \text{ subject to } \vec{1}_d^T \vec{s} = k \quad \text{[Equation 5]}$$

As in Equation 4, the score calculating unit 142 calculates the score S* of the sensors 10 to minimize the objective function on condition that the sum of the scores of the sensors 10 is equal to the number of sensors k. Also, the score calculating unit 142 calculates the score S* of the sensors to minimize the objective function in Equation 5 on further condition that the score $S_{*i}$ of each sensor 10 is from 0 to 1 inclusive.

When the score calculating unit 142 places an element with a value of 1 or a value close to 1 in the column vector of score S for an element in the change matrix D in response to the element having a large value, it acts in a direction increasing the objective function in Equation 5, and the result of multiplying the element with the large value by the value of 1 or the value close to 1 is not zero. When the score calculating unit 142 places element 0 in the column vector of score S for an element in the change matrix D in response to the element having a large value, it acts in a direction decreasing the objective function, and the result of multiplying the element with the large value by 0 is zero.

Similarly, when the score calculating unit 142 places an element with a value of 1 or a value close to 1 in the column vector of score S for an element in the change matrix D in response to the element having a small value (or 0), it acts in a direction decreasing the objective function, and the result of multiplying the element with the small value by the value of 1 or the value close to 1 is not zero. Therefore, the score calculating unit 142 places elements with a non-zero value in the column vector of score S in response to an element in change vector D having a small value (or 0), and minimizes the objective function.

When the score calculating unit 142 has calculated score S* using Equation 5, the sensor specifying unit 144 includes sensors with a score $S_{*i}$ of 0 in the group of changing sensors, excluding calculation errors. In other words, the sensor specifying unit 144 can specify whether sensors 10 are normal or abnormal in accordance with whether the value of score $S_{*i}$ for the sensor is zero or not zero. Because score $S_{*i}$ is from 0 to 1 inclusive and the total for the score values is k, the score calculating unit 142 calculates a minimum number k of non-zero elements among elements with score S* (in other words, the lower limit for the number of normal sensors is k).

Sometimes the sensor specifying unit 144 executes processing to convert non-zero values arising from calculation errors (such as 0.0001) to zero, and to convert values smaller than a predetermined threshold value (such as 0.01) to zero. This sensor specifying unit 144 uses a simple threshold value to address calculation errors and can still specify whether or not sensors 10 are normal or abnormal without using a threshold value that is based on user experience.

Here, Equation 5 is an objective function which has been formulated as a continuous relaxation problem, and is referred to as a non-convex optimization problem. A specific method for minimizing an objective function to calculate score S* is known. The score calculating unit 142 is able to calculate the scores S* using fewer calculations than in Equation 4 when the non-convex optimization problem expressed by Equation 5 is used.

In this explanation, the change calculating unit 130 in the present embodiment calculates the absolute values of the differences between the first relevance matrix $\Lambda_1$ and the second relevance matrix $\Lambda_2$ as a change in matrix D. Instead, the change calculating unit 130 may calculate a change matrix $A_\mu$ expressed by the following equation by adding a unit matrix I to the absolute values of the differences between the first relevance matrix $\Lambda_1$ and the second relevance matrix $\Lambda_2$ as a constant multiple.

$$A_\mu = abs(\Lambda_1 - \Lambda_2) + cI_d \qquad \text{[Equation 6]}$$

Here, $I_d$ is a unit matrix with d rows and d columns, and c is a constant. The change calculating unit 130 determines the multiplication factor for the constant multiple c so that the smallest eigenvalue $\lambda \min(A_\mu) = \mu$ in the change matrix $A_\mu$ is positive. Here, the eigenvalue $\mu$ is established as any value greater than 0, such as 0.001. Because the actual size of the eigenvalue $\mu$ has little or no effect on the calculated scores in the present embodiment, the value does not have to be adjusted.

When the change calculating unit 130 has calculated a change matrix $A_\mu$, the score calculating unit 142 may use the following calculation equation to obtain score S*.

$$\vec{s}^* = \operatorname*{argmin}_{\vec{s} \in [0,1]^d} \frac{1}{2} \vec{s}^T A_\mu \vec{s}, \text{ subject to } \vec{1}_d^T \vec{s} = k \qquad \text{[Equation 7]}$$

Equation 7 is an objective function which converts the change matrix D in Equation 5 to change matrix $A_\mu$. As in Equation 5, the score calculating unit 142 calculates the scores S* of the sensors 10 to minimize the objective function on condition that the sum of the scores of the sensors 10 are equal to the number of sensors k. Also, the score calculating unit 142 calculates score S* for the sensors to minimize the objective function in Equation 7 on further condition that the score $S_{*i}$ of each sensor 10 is from 0 to 1 inclusive.

As in a case in which the score calculating unit 142 uses Equation 5, the sensor specifying unit 144 includes sensors with a score S*i of 0 in the group of changing sensors, excluding calculation errors. In other words, the sensor specifying unit 144 can specify, for each sensor 10 in the plurality of sensors, whether the sensor is normal or abnormal in accordance with whether the value of the score S*i is zero or not zero instead of using a threshold value that is based on the experience of the user.

Here, the change calculating unit 130 calculates the change matrix $A_\mu$ in Equation 6 to convert the eigenvalues to values equal to or greater than 0. Therefore, Equation 7 is an objective function which formulates the continuous relaxation problem to approximate convex relaxation. In other words, Equation 7 is referred to as a convex optimization problem (convex quadratic programming problem), and local optima are treated as a global optima. Theoretically, and to make the actual calculations manageable, the amount of calculations can be reduced compared to the score calculations in Equation 5, and a solution can be determined uniquely. A specific method for minimizing the objective function of a convex optimization problem and calculating the score S* is known, and the score S* can be calculated using a known algorithm.

As described above, the score calculating unit 142 calculates the scores S* of the sensors 10 on condition that the sum of the scores of the sensors 10 equal a predetermined number of unchanging sensors k. The score calculating unit 142 may also calculate scores S* to minimize the objective function on further condition that the sum of the scores of the sensors 10 are equal to the number of unchanging sensors for different numbers of unchanging sensors. In other words, the score calculating unit 142 calculates scores $S_{*j}$ corresponding to a plurality of numbers of unchanging sensors $k_j$.

Then, the sensor specifying unit 144 determines, for each different number of unchanging sensors $k_j$, whether the sensors are in the group of unchanging sensors or the group of changing sensors on the basis of the scores $S_{*j}$ of the sensors 10. Therefore, in a situation in which a predetermined number of unchanging sensors k has not been indicated or a rough number of unchanging sensors k has been established, the detecting device 100 can specify the sensors 10 for different numbers of unchanging sensors $k_j$.

In this way, the detecting device 100 obtains groups of changing sensors for each k. Here, each group of changing sensors is obtained on the basis of different conditions. For example, a group of d-$k_m$ changing sensors obtained in response to $k_m$ unchanging sensors does not fall completely within a group of d-$k_{m-1}$ changing sensors obtained in response to $k_{m-1}$ unchanging sensors.

In other words, the overlapping sensors 10 in both the group of d-km changing sensors and the group of d-km-1 changing sensors can be identified as sensors 10 with a high probability of being abnormal from results specifying them as being in groups of changing groups under different conditions. Therefore, the detecting device 100 may determine a sensor 10 as having a higher probability of being an abnormal sensor on the basis of how many groups of overlapping sensors 10 were included among the groups of changing sensors corresponding to the different number of unchanging sensors kj. In this way, the detecting device 100 can rank sensors according to their probability of being abnormal based on the degree of overlap.

The score calculating unit 142 calculates score S* for the sensors 10 using Equation 4, Equation 5 and Equation 7 on condition that the sum of the scores of the sensors 10 equals a predetermined number k of unchanging sensors. However, the score calculating unit 142 may also calculate the score S* of the sensors 10 to minimize the objective function on condition that the sum of the scores of the sensors 10 equals the number d of sensors.

In other words, when a predetermined number of normal sensors (or a lower limit for the number) has been established, the score calculating unit 142 uses the objective function in Equation 4, Equation 5 or Equation 7 to calculate the score S*, but uses the objective function in the following equation when the number of normal sensors is unknown.

$$\vec{s}^* = \underset{\vec{s} \in R^d}{\operatorname{argmin}} \frac{1}{2} \vec{s}^T A_\mu \vec{s}, \text{ subject to } \vec{1}_d^T \vec{s} = d, \vec{s} \geq 0 \quad \text{[Equation 8]}$$

The score calculating unit 142 calculates the score S* of the sensors to minimize the objective function in Equation 8 on further condition that the score S* of each sensor 10 is a real number equal to or greater than 0. When the score calculating unit 142 places an element with a value that is a large real number in the column vector of score S for an element in the change matrix $A_\mu$ in response to the element having a large value, it acts in a direction increasing the objective function in Equation 8, and the result of multiplying the element with the large value by one is not zero. When the score calculating unit 142 places element 0 in the column vector of score S for an element in the change matrix $A_\mu$ in response to the element having a large value, it acts in a direction decreasing the objective function, and the result of multiplying the element with the large value by 0 is zero.

Therefore, the score calculating unit 142 places an element with a value that is not zero in the column vector of score S for an element in the change matrix Aµ in response to the element having a small value (or 0), and minimizes the objective function. As when the score calculating unit 142 uses Equation 5 and Equation 7, the sensor specifying unit 144 includes sensors with a score S*i of 0, excluding calculation errors, in the group of changing sensors. In other words, the sensor specifying unit 144 is able to specify whether sensors 10 are normal or abnormal on the basis of whether the value of the score S*i is zero or not zero, instead of using a threshold value that is based on the experience of the user.

Here, the score calculating unit 142 minimizes the objective function so that the sum of the scores $S_{*i}$ of d sensors 10 is d. The number of sensors 10 included in the group of changing sensors is unspecified, and the actual number is the number of sensors 10 with a score of 0. As in the case of Equation 7, Equation 8 is a convex optimization problem, and the score S* can be easily calculated using a known algorithm.

As mentioned above, the detecting device 100 in the present embodiment minimizes the objective function in accordance with the given conditions, and sensors 10 can be specified as normal or abnormal without using a threshold value that is based on the experience of the user. Also, the detecting device 100 can easily specify whether sensors are normal or abnormal using a known algorithm, even when the number of sensors installed in the system is in the hundreds.

Figure 3:
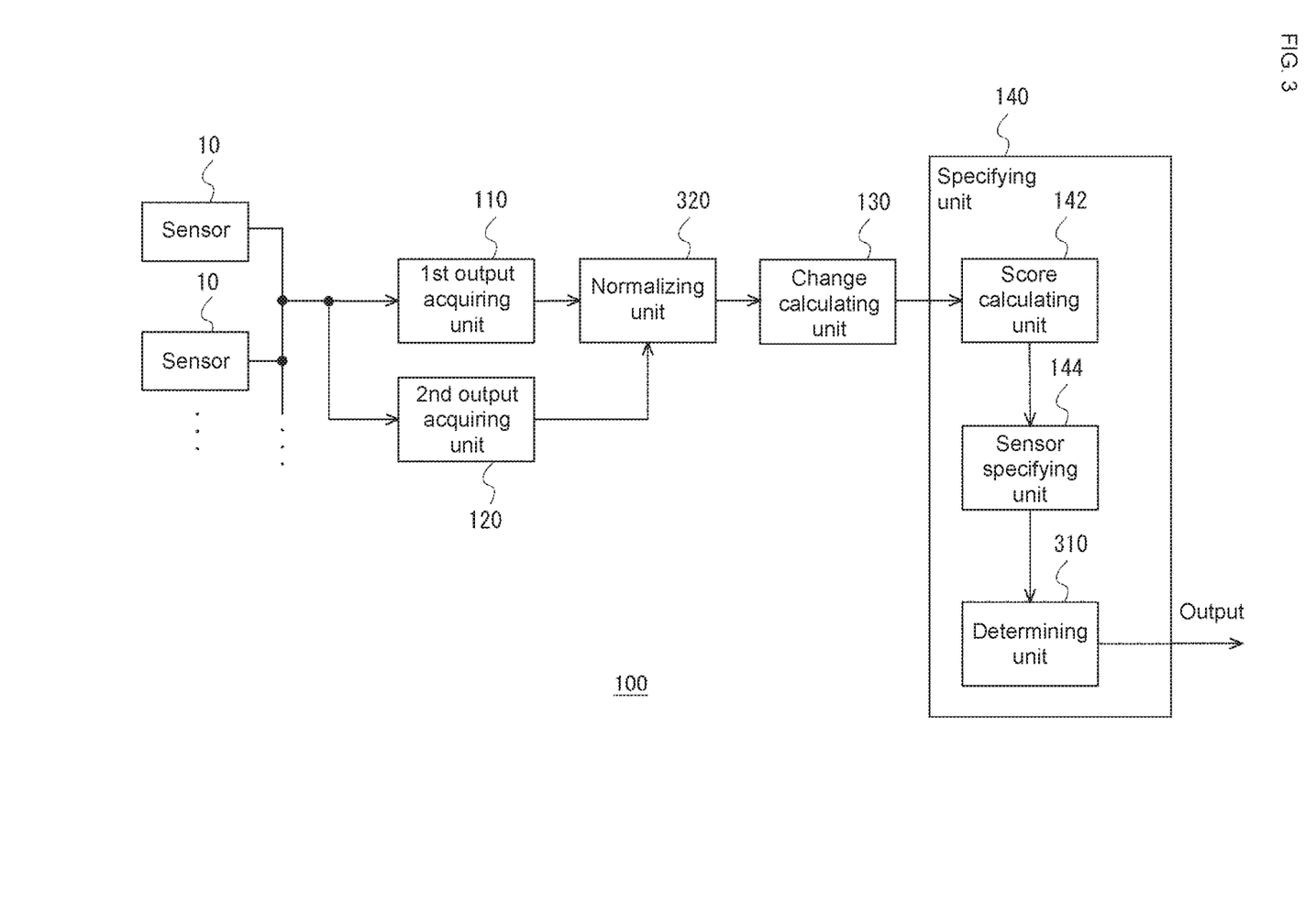
FIG. 3 shows a modified example of a configuration for the detecting device 100 in an embodiment of the present invention along with a plurality of sensors 10.

FIG. 3 shows a modified example of a configuration for the detecting device 100 in an embodiment of the present invention along with a plurality of sensors 10. In the detecting device 100 of the modified example, all operations identical or similar to those of the detecting device 100 of the embodiment shown in FIG. 1 are denoted by the same reference numbers, and further explanation has been omitted. The detecting device 100 in the modified example specifies sensors 10 using different objective functions but the same time-series data on the reference signals and the comparative signals to confirm the accuracy of specification results. This detecting device 100 also includes a determining unit 310.

The score calculating unit 142 in the modified example first calculates a first score value $S_{*1}$ for the sensors 10 to minimize the objective function on condition that the sum of the scores of the sensors 10 equals the number d of sensors. In other words, the score calculating unit 142 calculates a first score $S_{*1}$ using the objective function in Equation 8. Then, the sensor specifying unit 144 specifies a first group of unchanging sensors and a first group of changing sensors by including in the group of changing sensors all of the sensors with a first score $S_{*1}$ of 0, excluding calculation errors. In this way, the number $k_1$ of (normal) sensors 10 included in the group of unchanging sensors is specified.

Next, the score calculating unit 142 calculates a second score value $S_{*2}$ for the sensors 10 to minimize the objective function on condition that the sum of the scores of the sensors 10 equals the number $k_1$ of sensors in the first group of unchanging sensors. In other words, the score calculating unit 142 calculates a second score $S_{*2}$ using the one of the objective functions in Equation 4, Equation 5 or Equation 7. Then, the sensor specifying unit 144 specifies a second group of unchanging sensors and a second group of changing sensors by including in the group of changing sensors all of the sensors 10 with a second score $S_{*2}$ of 0, excluding calculation errors.

The determining unit 310 is connected to the sensor specifying unit 144 and receives the information on the groups of changing sensors and/or the group of unchanging sensors specified by the sensor specifying unit 144. The determining unit 310, in response to the sensor group information, determines whether or not the sensors in the first unchanging sensor group and second unchanging group, and/or the sensors in the first changing sensor group and the second changing sensor group match. The determining unit 310 may determine that the probability of the results from the sensor specifying unit 144 are high when the sensors 10 in two sensor groups match (or overlap).

In this way, the detecting device 100 in the modified example specifies sensors 10 using two different objective functions on the same reference signals and comparative signals to determine sensors with the same specification results. In this way, the detecting device 100 can select the specification results corresponding to the sensors 10 as highly accurate specification results.

In the explanation of the detecting device 100 in the modified example, the second unchanging sensor group and the second changing sensor group were specified after the first unchanging sensor group and the first changing sensor group had been specified. Additionally, the detecting device 100 may determine a third unchanging sensor group and a third changing sensor group. In other words, the score calculating unit 142 may calculate scores $S_{*m}$ using two or more objective functions among the objective functions of Equation 4, Equation 5 and Equation 7 after calculating the first score $S_{*1}$ using the objective function in Equation 8.

The sensor specifying unit 144 specifies each of the sensors 10 in accordance with each of the scores $S_{*m}$. The determining unit 310 determines whether or not the determination results of each sensor 10 match on the basis of each of the specification results for the sensors 10. The determining unit 310 may, for example, determine that sensors 10 with a high number of matches in the determination results are highly accurate specification results.

The detecting device 100 also includes a normalizing unit 320 connected to the first output acquiring unit 110 and the second output acquiring unit 120. The normalizing unit 320 normalizes a set of diagonal components in the first relevance matrix $\Lambda_1$ and the second relevance matrix $\Lambda_2$ to 1, and applies the conversion normalizing the first relevance matrix $\Lambda_1$ to the second relevance matrix $\Lambda_2$.

The change calculating unit 130 receives the normalized first relevance matrix $\Lambda_{1N}$ and second relevance matrix $\Lambda_{2N}$ from the normalizing unit 320, and calculates the change matrix on the basis of the differences between the two. Because two relevance matrices are normalized even when the size of the amplitude values of the output signals from the sensors 10 are different, the change calculating unit 130 can calculate the degree of change from the differences, which is proportional to 1 or the normalized value.

In the explanation of the detecting device 100 in the present embodiment, abnormal sensors 10 could be detected using first signals acquired when the object was in a normal state as reference values, and second signals obtained during a test period as comparative values. However, the detecting device 100 may use first signals acquired from the object in a first predetermined period and second signals acquired from the object in a second predetermined period different from the first period.

Because not all of the sensors 10 in the first period are normal sensors, sensors 10 specified by the sensor specifying unit 144 as belonging to the changing sensor group are sensors 10 that have either changed from normal sensor to abnormal sensor or from abnormal sensor to normal sensor. The detecting device 100 can monitor changes in the sensors 10 by successively specifying the sensors 10 in a time series. Also, because most sensors 10 in a steady state are normal sensors, for example, in a vehicle, the normal sensors and abnormal sensors can be identified on the basis of results from monitoring the state of a vehicle in a time series.

Figure 4:
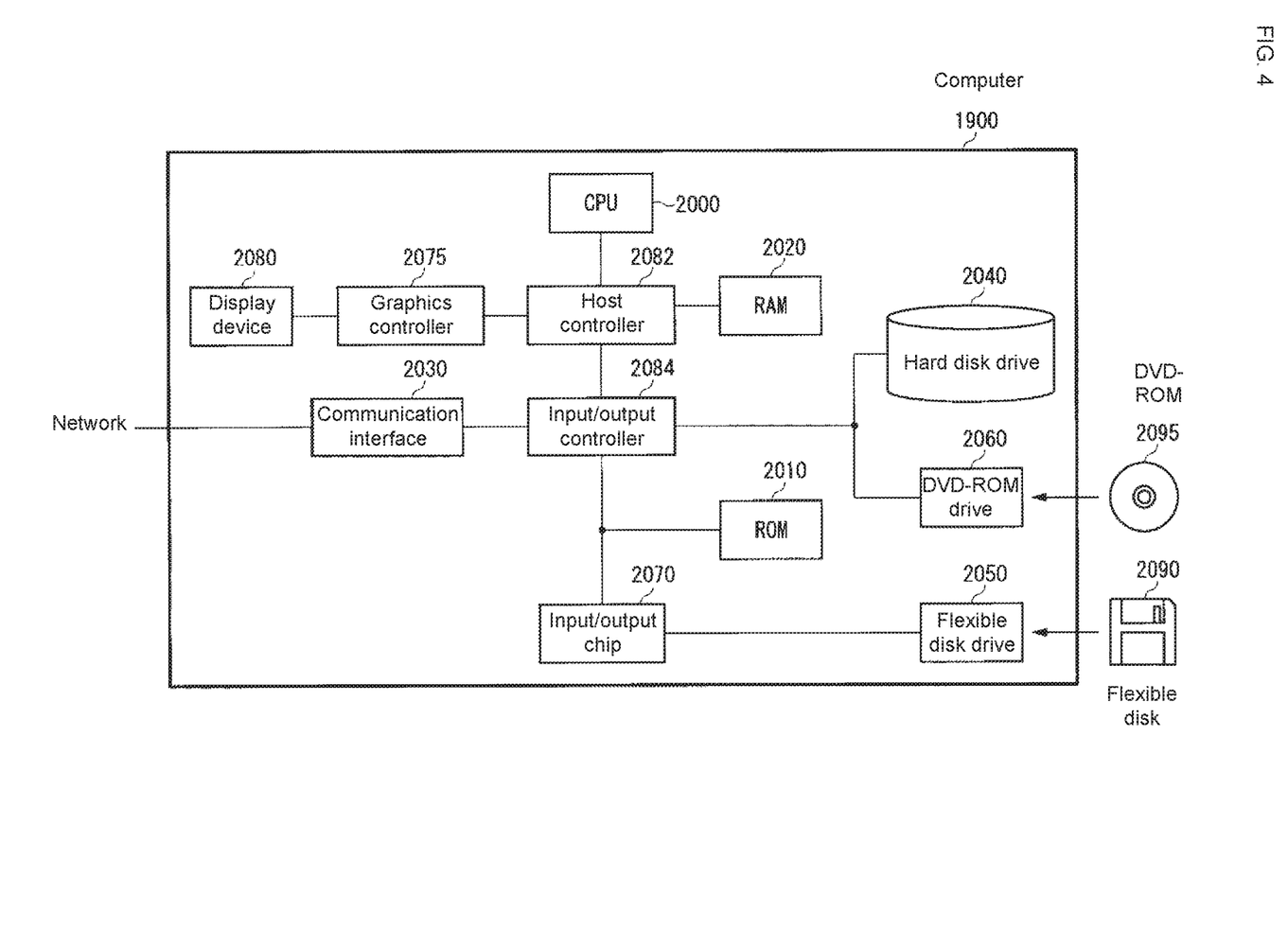
FIG. 4 shows an example of a hardware configuration for the computer 1900 functioning as the detecting device 100 in the present embodiment.

FIG. 4 shows an example of a hardware configuration for the computer 1900 functioning as the detecting device 100 in the present embodiment. The computer 1900 in the present embodiment is equipped with a CPU peripheral portion having a CPU 2000, RAM 2020, graphics controller 2075 and display device 2080 connected to each other by a host controller 2082, an input/output portion having a communication interface 2030, a hard disk drive 2040 and a DVD drive 2060 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a DVD-ROM drive 2060. The communication interface 2030 communicates with the other devices via a wired or wireless network. The hard disk drive 2040 stores the programs and data used by the CPU 2000 in the computer 1900. The DVD-ROM drive 2060 reads programs and data from the DVD-ROM 2095 and provides them to the hard disk drive 2040 via the RAM 2020.

The input/output controller 2084 is connected to the ROM 2010, the flexible disk drive 2050, and the relatively low-speed input/output device of the input/output chip 2070. The ROM 2010 stores the boot program executed by the computer 1900 at startup and/or programs relying on hardware in the computer 1900. The flexible disk drive 2050 reads programs or data from a flexible disk 2090, and provides the programs and data to the hard disk drive 2040 via the RAM 2020. The input/output chip 2070 connects the flexible disk drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a flexible disk 2090, DVD-ROM 2095 or IC card, and provided by the user. A program is read from the recording medium, installed in the hard disk drive 2040 inside the computer 1900 via the RAM 2020, and executed by the CPU 2000.

Programs are installed in the computer 1900 to enable the computer 1900 to function as a 1st output acquiring unit 110, a 2nd output acquiring unit 120, a change calculating unit 130, and a specifying unit 140.

The information processing steps written in these programs are specific means activated by reading the programs to the computer 1900 so that the software cooperates with the various types of hardware resources described above. These specific means function as the 1st output acquiring unit 110, the 2nd output acquiring unit 120, the change calculating unit 130, and the specifying unit 140. These specific means realize operations and the processing of information in the computer 1900 of the present embodiment to construct a specific detecting device 100 for this intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, flexible disk 2090 or DVD-ROM 2095, or writes reception data received from the network to a reception buffer region of the storage device. In this way, the communication interface 2030 transfers transmitted and received data to a storage device using the direct memory access (DMA) method. Alternatively, the CPU 2000 transfers transmitted and received data by reading data from the source storage device or communication interface 2030, and transfers and writes data to the destination communication interface 2030 or storage device.

Also, the CPU 2000 writes all of the data or the necessary data to the RAM 2020 via, for example, a DMA transfer, from files or databases stored in the storage unit or another external storage device such as a hard disk drive 2040, a DVD-ROM drive 2060 (DVD-ROM 2095) or a flexible disk drive 2050 (flexible disk 2090), and performs various types of processing on the data in the RAM 2020. The CPU 2000 then writes the processed data to an external storage device via, for example, a DMA transfer. Because the RAM 2020 temporarily stores the contents of the external storage device during this process, the RAM 2020 and the external storage device are generally referred to in the present embodiment as memory, a storage unit, or a storage device. The various types of information in the programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

The CPU 2000 can also retrieve information stored in files and databases inside the memory device. For example, when a plurality of entries associating an attribute value for a second attribute to an attribute value for a first attribute, the CPU 2000 can retrieve an entry matching the conditions indicated by the attribute value of the first attribute among the plurality of entries stored in the storage device, and then obtain the attribute value of the second value associated with the first value satisfying a predetermined condition by reading the attribute value of the second attribute stored in the entry.

A program or module described above can be stored in a recording medium of an external unit. Instead of a flexible disk 2090 or a DVD-ROM 2095, the recording medium can be an optical recording medium such as a DVD, Blu-ray (registered trademark) or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using terms such as "previous" and "prior". However, these operations, steps and processes can be realized in any order as long as the output of a previous process is used by a subsequent process. The operational flow in the claims, description and drawing were explained using terms such as "first" and "next" for the sake of convenience. However, the operational flow does not necessarily have to be executed in this order.

REFERENCE SIGNS LIST

10: Sensor, 100: Detecting device, 110: 1st output acquiring unit, 120: 2nd output acquiring unit, 130: Change calculating unit, 140: Specifying unit, 142: Score calculating unit, 144: Sensor specifying unit, 310: Determining unit, 320: Normalizing unit, 1900: Computer, 2000: CPU, 2010: ROM, 2020: RAM, 2030: Communication interface, 2040: Hard disk drive, 2050: Flexible disk drive, 2060: DVD drive, 2070: Input/output chip, 2075: Graphics controller, 2080: Display device, 2082: Host controller, 2084: Input/output controller, 2090: Flexible disk, 2095: DVD-ROM.

The invention claimed is:

1. A device comprising a processor coupled to a memory, the processor being configured to:
acquire time-series data from a plurality of sensors installed on a vehicle, wherein the plurality of sensors are configured to monitor aspects of driver and vehicle conditions and the time-series data comprises a first output from the plurality of sensors and a second output from the plurality of sensors;
acquire a first relevance matrix representing the degree of relevance between the plurality of sensors during the first output from the plurality of sensors, wherein each element of the matrix represents the degree of relevance between two sensors;
acquire a second relevance matrix representing the degree of relevance between the plurality of sensors during the second output from the plurality of sensors, wherein each element of the matrix represents the degree of relevance between two sensors;
calculate a change matrix representing the degree of change between the first relevance matrix and the second relevance matrix;
specify, as a group of changing sensors showing a change between the first output and the second output, a group of sensors from the plurality of sensors showing a degree of change greater than the remaining sensors of the plurality of sensors in the change matrix;
calculate a score for each sensor of the plurality of sensors to minimize an objective function corresponding to a value obtained by multiplying scores for the plurality of sensors corresponding to their degree of change by each of the degrees of change included as elements in the change matrix;

specify a group of unchanging sensors not showing a change between the first output and the second output, and a group of changing sensors on the basis of the scores of the sensors; and wherein the processor is further configured to:

calculate scores for the plurality of sensors to minimize the objective function on condition that the score of each sensor is equal to or greater than 0, and include sensors with a score of 0 in the group of changing sensors excluding calculation errors;

calculate scores for the plurality of sensors to minimize the objective function on further condition that a sum of the scores of the plurality of sensors is a predetermined value;

calculate a first score value for the plurality of sensors to minimize the objective function on condition that the sum of the scores of the plurality of sensors equals the number of sensors;

specify a first group of unchanging sensors and a first group of changing sensors by including sensors with a first score of 0 in the group of changing sensors;

calculate a second score value for the plurality of sensors to minimize the objective function on condition that the sum of the scores of the plurality of sensors equals the number of sensors in the first group of unchanging sensors;

specify a second group of unchanging sensors and a second group of changing sensors by including sensors with a second score of 0 in the group of changing sensors; and determine matching sensors in at least either the first group of unchanging sensors and the second group of unchanging sensors, or the first group of changing sensors and the second group of changing sensors; and identify abnormalities related to the operation of the vehicle based on the group of unchanging sensors and the group of changing sensors.

2. The device according to claim 1, wherein the processor is further configured to specify a submatrix of sensors from the plurality of sensors having a degree of changes smaller than the other sensors from the change matrix, and specify the group of sensors not corresponding to the submatrix as the group of changing sensors.

3. The device according to claim 1, wherein the processor is further configured to calculate scores for the plurality of sensors to minimize the objective function on further condition that a sum of the scores of the sensors is equal to the number of sensors in the plurality of sensors.

4. The device according to claim 1, wherein the processor is further configured to calculate scores for the plurality of sensors to minimize the objective function on further condition that the sum of the scores of the sensors is equal to a predetermined number of unchanging sensors.

5. The device according to claim 4, wherein the processor is further configured to calculate scores for the plurality of sensors to minimize the objective function on further condition that the score of each sensor is from 0 to 1 inclusive.

6. The device according to claim 4, wherein the processor is further configured to calculate scores for the plurality of sensors to minimize the objective function on further condition that the score of each sensor is 0 or 1.

7. The device according to claim 4, wherein the processor is further configured to:

calculate scores for the plurality of sensors to minimize the objective function on further condition that the sum of the scores of the sensors equals a number of unchanging sensors for each of a different number of unchanging sensors, and specify the group of unchanging sensors and the group of changing sensors on the basis of the scores of the sensors for each of a different number of unchanging sensors.

8. The device according to claim 1, wherein the processor is further configured to calculate the change matrix on the basis of absolute values of the differences between the first relevance matrix and the second relevance matrix.

9. The device according to claim 8, wherein the processor is further configured to calculate the change matrix by adding a unit matrix multiplied by a constant to the absolute values of the differences between the first relevance matrix and the second relevance matrix.

10. The device according to claim 9, wherein the processor is further configured to determine the constant so the smallest eigenvalue in the change matrix is positive.

11. The device according to claim 1, wherein the processor is further configured to normalize the elements of one diagonal in the first relevance matrix and the second relevant matrix to 1, and normalize the first relevance matrix to the second relevance matrix.

12. The device according to claim 1, wherein the processor is further configured to acquire the first relevance matrix corresponding to the first output outputted by the sensors, and acquire the second relevance matrix corresponding to the output outputted by the sensors during an inspection period for an object when the object provided with the sensors is in a normal state.

* * * * *